US009769544B1

(12) United States Patent
 Pau

(10) Patent No.: US 9,769,544 B1
(45) Date of Patent: Sep. 19, 2017

(54) PRESENTING CONTENT WITH VIDEO CONTENT BASED ON TIME

(75) Inventor: Alexander Pau, Fremont, CA (US)

(73) Assignee: Google Inc., Mountain View, CA (US)

( * ) Notice: Subject to any disclaimer, the term of this patent is extended or adjusted under 35 U.S.C. 154(b) by 1921 days.

(21) Appl. No.: 11/953,193

(22) Filed: Dec. 10, 2007

(51) Int. Cl.
 *H04N 21/85* (2011.01)
 *H04N 21/45* (2011.01)
(52) U.S. Cl.
 CPC ............ *H04N 21/85* (2013.01); *H04N 21/45* (2013.01)
(58) Field of Classification Search
 USPC ...................................... 725/32–37
 See application file for complete search history.

(56) References Cited

U.S. PATENT DOCUMENTS

| | | | | |
|---|---|---|---|---|
| 6,119,154 A * | 9/2000 | Weaver | ............ | H04N 21/2387 348/E5.008 |
| 6,263,505 B1 * | 7/2001 | Walker et al. | ................ | 725/110 |
| 6,438,751 B1 * | 8/2002 | Voyticky | ............... | H04H 60/40 725/42 |
| 6,698,020 B1 * | 2/2004 | Zigmond | .......... | H04N 5/44513 348/E5.102 |
| 7,822,743 B2 * | 10/2010 | Henkin | ............ | G06F 17/30867 707/636 |
| 8,768,766 B2 * | 7/2014 | Ellis | .................. | G06Q 30/0242 705/14.43 |
| 2002/0056082 A1 * | 5/2002 | Hull et al. | ........................ | 725/1 |
| 2002/0104088 A1 * | 8/2002 | McGee et al. | .................. | 725/51 |
| 2002/0124268 A1 * | 9/2002 | Krishnan et al. | ............. | 725/139 |
| 2002/0162113 A1 * | 10/2002 | Hunter | ................... | G06Q 30/02 725/87 |
| 2003/0050863 A1 * | 3/2003 | Radwin | ................. | G06Q 30/02 705/26.1 |
| 2005/0138674 A1 * | 6/2005 | Howard | ................ | H04N 7/088 725/136 |
| 2007/0282906 A1 * | 12/2007 | Gabriel | ...................... | 707/104.1 |
| 2007/0288950 A1 * | 12/2007 | Downey | ............. | H04H 20/103 725/9 |
| 2008/0294524 A1 * | 11/2008 | Badros | ................... | G06Q 30/02 705/14.54 |
| 2009/0037239 A1 * | 2/2009 | Wong | ................ | G06Q 30/0201 705/7.29 |

OTHER PUBLICATIONS

Anonymous, Blinkx.com, http://www.blinkx.com/video-technology—Video Search Technology—Blinkx, printed from the Internet on Nov. 21, 2007, 10 pages.
Anonymous, Wikipedia—free encyclopedia, http://en.wikipedia.org/wiki/Dayparting—Dayparting, printed from the Internet on Nov. 28, 2007, 2 pages.

\* cited by examiner

*Primary Examiner* — Nathan Flynn
*Assistant Examiner* — Christine Kurien
(74) *Attorney, Agent, or Firm* — Foley & Lardner LLP; John D. Lanza

(57) ABSTRACT

Techniques are described for temporally targeted content placement for video content. A time mark that is associated with a sponsored-content trigger may be accessed. Presentation of a sponsored-content item is triggered based on the sponsored-content trigger associated with the time mark such that the sponsored-content item is presented at a point of time substantially in accordance with the time mark.

17 Claims, 9 Drawing Sheets

PRESENTING CONTENT WITH VIDEO CONTENT BASED ON TIME

TECHNICAL FIELD

This disclosure relates generally to presenting content with videos.

BACKGROUND

Online video is a growing medium. The popularity of online video services reflect this growth. Advertisers see online video as another way to reach their customers. Many advertisers are interested in maximizing the number of actions (e.g., impressions and/or click-throughs) for their advertisements. To achieve this, advertisers make efforts to target advertisements ("ads") to content, such as videos, that are relevant to their advertisements.

In some online advertising systems, advertisers pay for their ads through an advertising auction system in which they bid on advertisement placement on, for example, a Cost-Per-Click (CPC) or a Cost-Per-Mille (e.g., thousand impressions) (CPM) basis. The advertiser typically has a budget to spend on advertising, and the auction may be run between competing advertisers via each bidder's CPC and/or CPM bid given the advertiser's budget, or through a more complex equation of CPC and CPM, such as one that weighs the advertiser's bid by that advertisement's known Click-Thru-Rate (CTR) or other values. In one variation on the system, an advertiser targets an advertisement at a particular content location, web site, or content category, and the advertiser's bid is weighted by an estimated Click Through Rate (eCTR).

SUMMARY

In one general aspect, a time mark that represents a point of time relative to a playback start time of a video is accessed. The time mark is associated with a keyword describing video content presented at the point of time relative to the playback start time. Passage of time is tracked from starting playback of the video to a viewer. When the passage of time from starting playback of the video to the viewer matches the time mark, presentation of an advertisement to the viewer is triggered. The advertisement is associated with the keyword describing the video content being presented.

In another general aspect, a time mark that represents a point of time relative to a playback start time of a video content item is accessed. The time mark is associated with a sponsored-content trigger. Passage of time is tracked from starting playback of the video content to a recipient. Presentation a sponsored-content item is triggered based on the sponsored-content trigger associated with the time mark such that the sponsored-content item is presented at or in proximity to a point of time substantially in accordance with the time mark.

Implementations may include one or more of the following features. For example, the sponsored-content item may be presented when the passage of time from starting playback of the video content matches the time mark. The sponsored-content item may be identified based on the trigger associated with the time mark. The sponsored-content trigger may include one or more keywords describing video content. The sponsored-content item may be identified based on the one or more keywords that are associated both with the sponsored-content item and with the time mark. The one or more keywords may include at least one keyword representing a category of keywords.

An advertisement to be presented may be specified. The sponsored-content item specified by the sponsored-content trigger may be presented. Presentation of the sponsored-content item that is included with the video content item may be triggered. Presentation of the sponsored-content item may be triggered by accessing the sponsored-content item separately from accessing the video content item. The time mark may be established by using programming guide information. The sponsored-content item may include one or more of audio content, video content, an image or an application that enables a recipient to take action relative to the sponsored-content item. The playback start time may be an absolute time indicating when playback of video content started. The playback start time may be a relative time indicating when playback of video content started.

In yet another general aspect, computing device includes a computer program stored on a computer readable medium. The stored computer program includes instructions, that when execute, cause the computing device to perform functions. The functions include accessing a time mark that is associated with a sponsored-content trigger and triggering presentation of a sponsored-content item based on the sponsored-content trigger associated with the time mark.

Implementations may include one or more of the features noted above and one or more of the following features. For example, accessing a time mark may include accessing a time mark that represents a point of time relative to a playback start time of a video content item. Tracking time may include tracking passage of time from starting playback of the video content to a viewer. Triggering presentation may include triggering presentation of a sponsored-content item based on the sponsored-content trigger associated with the time mark when the passage of time from starting playback of the video content matches the time mark.

The time mark may represent a point of time that is independent of a playback start time of a video content item. The sponsored-content item may represents one or more of an advertisement, an interactive form configured to receive user input, and an application capable of being executed by the computing device.

The computing device may include one or more of a user device capable of playing the video content item, a portable user device capable of tracking time and triggering the sponsored-content item based on time, a computer server capable of streaming the video content item to a viewer, a set-top box capable of tracking time and triggering the sponsored-content item based on time, a television capable of tracking time and triggering the sponsored-content item based on time, a music player capable of tracking time and triggering the sponsored-content item based on time, a mobile telephone capable of tracking time and triggering the sponsored-content item based on time, and a DVD player capable of tracking time and triggering the sponsored-content item based on time.

In a further general aspect, a time mark that is associated with a sponsored-content trigger may be accessed and presentation of a sponsored-content item is triggered based on the sponsored-content trigger associated with the time mark such that the sponsored-content item is presented at a point of time substantially in accordance with the time mark. Implementations may include one or more of the features noted above.

In another general aspect, a time mark that represents a point of time relative to a playback start time of a content item is accessed. The time mark is associated with a sponsored-content trigger. Passage of time is tracked from starting playback of the content to a recipient. Presentation of a sponsored-content item is triggered based on the sponsored-content trigger associated with the time mark such that the sponsored-content item is presented at or in proximity to a point of time substantially in accordance with the time mark. Implementations may include one or more of the features noted above.

DETAILED DESCRIPTION

Figure 1A:
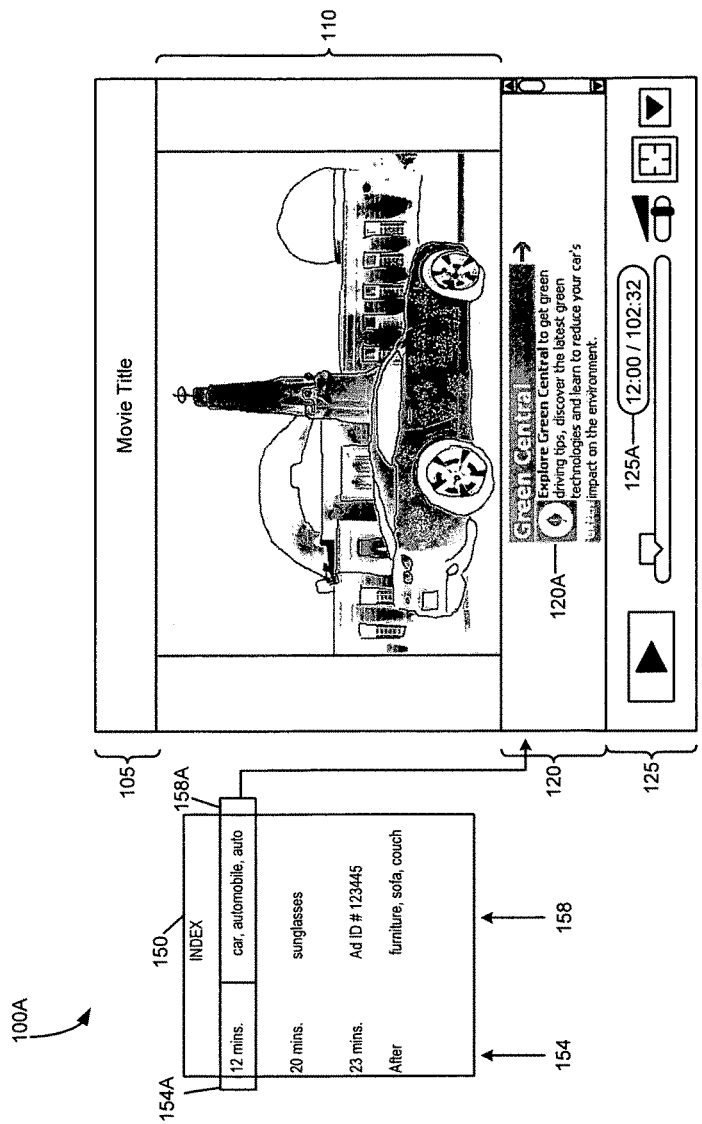
FIGS. 1A-1D are examples of a user interface illustrating advertising content displayed with video content in a video player.

FIGS. 1A-1D are examples of a user interface illustrating advertising content displayed with video content in a video player. The advertising content may be placed within or proximate to the video content. For example, the advertising content may be placed as an overlay, streamed with the video content, or presented near the video content. The video content and advertising content may be provided by content providers. The content providers, for example, may include content creators (e.g., video website members, video makers, etc.), content publishers (e.g., video website administrators, CNN, broadcasters) and advertisers.

Various techniques may be used to target suitable advertising content to place within or proximate to a selection of video content. In some implementations, advertising content may be targeted to video content having similar contextual information. For example, an advertisement for a lawn mower may be placed within or near a landscaping video. In one example, targeting relevant advertising content may be temporally based. More particularly, advertising content may be targeted for presentation at a time relative to when the video content stream started playing. For example, during video playback, a server hosting the video content may track the start time and play time throughout the video presentation. As such, the server may determine to display advertisements at a specific point in time relative to the beginning of the video content stream.

In some implementations, video content may be annotated such that specific keywords or categories correspond to time points in the video content. For example, a content provider may annotate the video content or television programming with time marks and associate content keywords to those time marks. A content keyword may describe video content displayed at the associated time mark. A time mark may be a timestamp denoting elapsed time from the beginning of a video. In one example, a time mark of 12:00 minutes is associated with a keyword of automobile for a video in which a car is displayed 12 minutes after the start of the video. Thus, the content provider may annotate the video to associate the content keyword automobile with the 12 minute time mark. The association of the time mark with the video content keyword may provide a trigger for an advertisement relevant to the video content (here, automobile) to be inserted, overlaid, or otherwise presented to a viewer at the 12 minute time mark. In some implementations, a time mark may be a pointer or otherwise linked to a time in the future. For example, a time mark may be a few seconds (or another substantially short period of time) before the time slot in which the ad is to be played, with the time mark indicating how far in the future that the ad is to occur.

A video content keyword may represent, for example, a category of a tangible item (such as an automobile or car), a more specific tangible item (such as a particular automobile model), and/or a service or action being performed (such as a visit to a doctor's office). In some implementations, more than one video content keyword may be associated with a time mark. Video content keywords associated with a time mark may represent different aspects of the content displayed at the time mark. For example, keywords may be associated with a time mark such that some of the keywords represent one aspect of the display content (car, automobile and a keyword for a particular make and model of a car for an automobile being presented) and keywords for another aspect of the displayed content (dog and beagle for a dog being shown walking by the presented automobile) for another aspect of the displayed content.

Annotating video content may be performed prior to providing the video content to a viewer. For example, a content provider or creator may review of the video content and create an index of annotations (e.g., time marks associated with video content keywords) before airing or distributing the video content to a viewer. During the review, the content provider, creator or publisher may match one or more keywords describing video content displayed at the time of the time mark.

In some implementations, time marks may be established by using programming guide information for a particular channel or multiple channels in addition to, or in lieu of, reviewing and annotating the video content manually. As an example, a program guide indicates that a particular video program having to do with domestic animals begins at 8:00 p.m. and a time mark for an advertisement slot in the program exists fifteen minutes after the video program has started at 8:00 p.m. The advertisement slot is associated with the keywords pets, animals, dog and cat based on the program content of domestic animals. At an appropriate time (here, fifteen minutes after the start of the program, which in this case is 8:15 p.m.) the keywords pets, animals, dog and cat are used to select and present an advertisement in a web page presented on the same display device as the program is being viewed.

In general, the advertisement trigger may invoke presentation of the matched advertisement upon reaching the video time mark. In some implementations, the advertisement trigger may specify one or more advertisements to be presented based on a keyword, keywords, categories, service provider data, advertiser data, programming guide data, video content data, index content, and other metadata extracted from the video content, advertisement content, or a user interaction, for example.

FIG. 1A is an example user interface 100A illustrating advertising content displayed on a screen with video content. The user interface 100A illustrates an example video player user interface displayed on a video device. Examples of video media players include Windows® Media Player, QuickTime® Player, or iTunes®. Examples of video devices include computers, video players (such as DVD players and VCR players), video-capable game consoles, televisions or television set-top boxes, a mobile telephone with video functionality, an automobile video player, a portable audio device, a portable game device, a mobile player with storage, mobile telephone, portable music player, or another type of device that plays video content. The content shown in the user interface 100A, for example, may be provided by an advertisement provider, a content provider, another networked device, or some combination of those providers for display on a user video device.

The user interface 100A includes a playback information region 105, a video display region 110, an advertising content region 120, and a control region 125. Although different content is presented in each interface, each of the interfaces depicted in FIGS. 1A-1D include regions 105-125. In some implementations, different arrangements of the regions and/or content may be presented.

The playback information region 105 may include information about the content presented in the video display region 110. For example, playback information region 105 may display programming information, upcoming video content, titles, credits, network identifiers, etc. As illustrated, the movie title of the video is presented in the playback information region 105.

The video display region 110 may include a media player for presenting text, images, video, or audio, or any combination thereof. In some implementations, the presented content may be streamed. Additionally or alternatively, the presented content may be programmed television, downloaded video, images, other types of interactive media, etc. As an example, the region 110 may be presented as a stream, upon visiting a particular site presenting content, after the execution of a downloaded file containing content, or upon activation of a link to the video content.

The advertising content region 120 displays advertisements, including advertisements presented based on time marks and video content keywords associated with time marks. An advertisement or an "ad" refers to any form of communication in which one or more products, services, ideas, people, organizations or other items are identified and promoted (or otherwise communicated). Ads are not limited to commercial promotions or other communications. An ad may be a public service announcement or any other type of public notice, such as a public notice published in printed or electronic press or a broadcast. An ad may be referred to or include sponsored-content.

Examples of ads include banner ads, flash-based video/audio ads, scrolling ads, and other formats. In some implementations, on-screen ads may include text-and-audio content, audio content, video, text, animated images, still images, an application that enables a view to take action relative to the advertisement, or some combination thereof. The advertising content region 120 may also display other content, such as links, third party add-ins (e.g., search controls, download buttons), video and audio clips (e.g., graphics), or help instructions (e.g., text, html, pop-up controls). The other content may be related to the content displayed in the video player region 110. For example, temporal data, boundaries, targeting criteria, and other metadata related to the video player content may be used to determine the other content displayed in region 120.

The control region 125 includes an elapsed time display 125A that indicates the amount of time that has elapsed since the video began (here, 12:00 minutes) and the total time of the video (here, 102:32 minutes).

The control region 125 also includes media player controls (e.g., volume adjustment, full-screen mode, play/pause button, progress bar and slider, option menu). Controls within the control region 125 may be selected by a user of system 100A to adjust the volume, screen mode, and video portion being played, for example.

An index 150 corresponds to video content displayed in video display region 110 and is used to trigger at least some of the ads presented in the advertisement content region 120. The index 150 includes a list 154 of time marks and a list 158 of keywords or identifier information where each keyword or identifier information is associated with a time mark. As such, each time mark is associated with and corresponds to one or more keywords identifying the content playing in the video display region 110. In some implementations, the index 150 may be pre-configured by a content creator, a content provider, an advertising system, or a programming guide. Additionally or alternatively, the index 150 also may be configured using input, and in some implementations, substantially real-time input, from a user who is viewing the video. In one example, a video publisher can solicit comments from viewers throughout the video playback, and a user who is viewing the video may use text comments to annotate time marks. In general, the index 150 may be used to determine relevant advertising content for one or more particular time slots.

As shown in FIG. 1A, the video display region 110 shows a video portion of the movie. Here, the video portion includes a car parked in front of a building. The video portion is the image shown at 12:00 minutes out of a total play time of 102 minutes and 32 seconds for the movie, as indicated by the elapsed time display 125A. In this example, the advertising content region 120 presents an advertisement 120A for Green Central regarding the exploration of environmental impact and vehicles. As shown by the index entry 154A, the advertisement 120A correlates to the time mark 154A (e.g., 12 minutes) and the corresponding keywords 158A (e.g., car, automobile, auto). In some implementations, the advertisement 120A may have been targeted for display at the 12 minute mark based upon analysis of the current content in the video player (e.g. the car), rather than through the use of the keywords 158A in the index 150.

In operation, once the video content has played for 12 minutes (which is reflected in this example in the elapsed time display 125A), the device hosting or the device playing the video content triggers presentation of advertisement 120A based on the ad trigger 158A. For example, a server hosting the video may access index 150, retrieve the ad trigger 158A for time mark 154A, and present the advertisement 120A in the adverting content region 120. In some implementations, the server may perform an ad match using the ad trigger to obtain advertisement 120A. For example, an advertisement may be matched to an ad trigger based on keyword, keyword, categories, or by accessing service providers, advertisers, or other video content providers.

Additionally or alternatively, a media player on the playback device may trigger presentation of the ad 120A in the advertising content region 120. In some implementations, the ad may be included with the video content. Thus, upon meeting the 12 minute time mark, the preloaded ad is triggered and presented in the advertising content region 120.

Figure 1B:
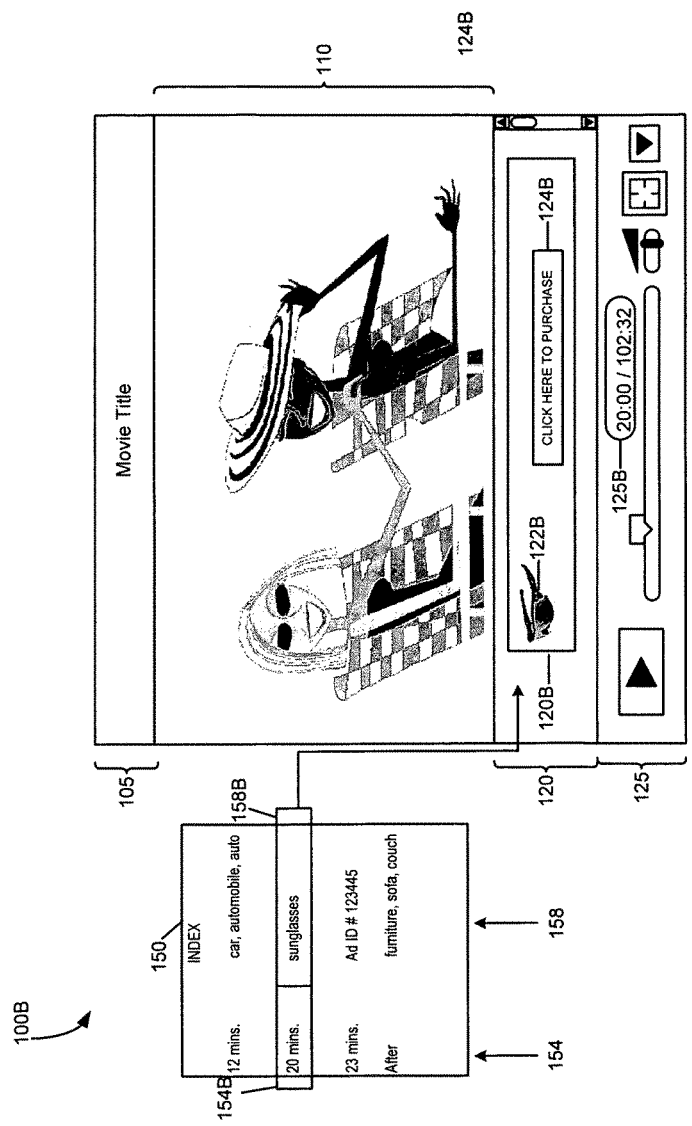

FIG. 1B is another example user interface 100B illustrating advertising content displayed on a screen with video content. Continuing the example presented with regard to FIG. 1A, the movie is playing in video display region 110 of FIG. 1B and shows an image displayed after 20 minutes has elapsed since the start of the movie. In the example of FIG. 1B, the video content includes two women in chairs, one of whom is wearing sunglasses. The elapsed time display 125B shows a running time of 20:00 minutes out of a total of 102 minutes and 32 seconds (e.g., 20:00/102:32). Here, the advertising content region 120 presents an advertisement 120B for a pair of sunglasses. The advertisement 120B includes a graphic 122B of sunglasses and a control 124B that enables a viewer to access a web site to purchase a pair of sunglasses. As shown, the advertisement 120B correlates to the selected time mark 154B (e.g., 20 minutes) and the corresponding keyword 158B (e.g., sunglasses).

In one example, once the video has played for 20 minutes, the server hosting the video triggers presentation of advertisement 120B by accessing index 150, retrieving the ad trigger 158B for time mark 158B, and presenting the advertisement 120B to the viewer. The viewer may activate or otherwise select the control 124B, which opens a browser window and accesses a web site of the advertiser, which, in turn, enables the viewer to purchase a pair of sunglasses.

Figure 1C:
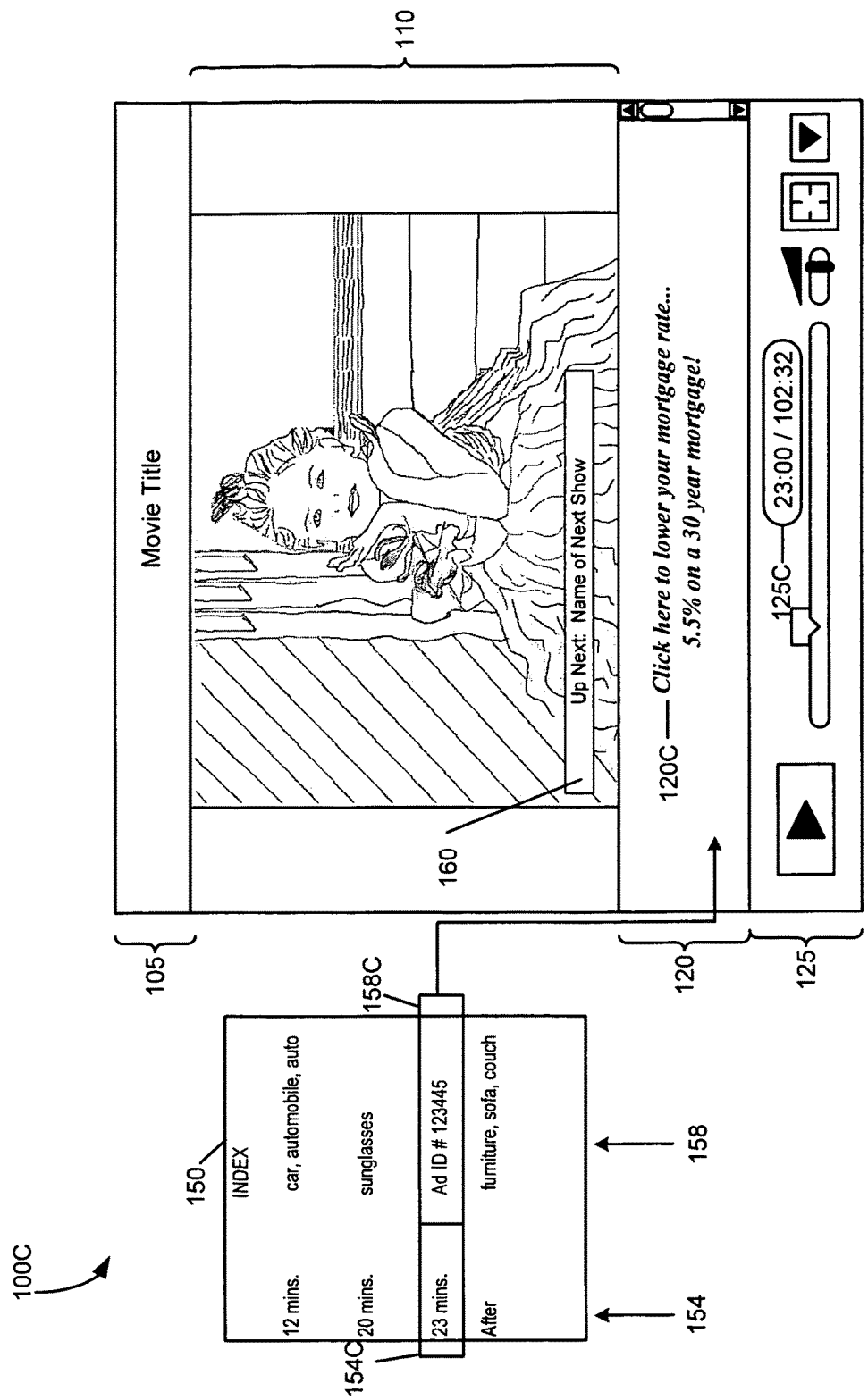

Continuing with the example, FIG. 1C depicts a user interface 100C illustrating advertising content displayed on a screen with video content at a later point in time. Similar to FIGS. 1A and 1B, the movie continues to play in video display region 110. In this example, the video content includes a girl in a party dress. The elapsed time display 125C shows a running time of 23:00 minutes. The region 120 presents an advertisement 120C for a mortgage lender. As shown, the advertisement 120C correlates to the selected time mark 154C (e.g., 23 minutes) and the corresponding ad identifier 158C (e.g., Ad ID #123445). In some implementations, the advertisement 120C may have been randomly selected from a list of approved ads for display at the 23 minute mark. Thus, the ad may not be matched to content in the current video, but instead may be selected from a list of ads based on other factors.

In operation, once the video content reaches the 23 minute time mark, the server hosting the video content triggers presentation of advertisement 120C. For example, the server may access index 150, retrieve the ad trigger 158C for time mark 158C, and enable presentation of advertisement 120C to the viewer. Upon reaching the 23 minute time mark, the preloaded ad is triggered and presented to the viewer. At some point, the viewer may view the mortgage rate ad 120C and may choose to select the ad or ignore the ad, for example.

In some implementations, multiple ad displays may be presented at one time. For example, an overlaid ad 160 is also included in the interface 100C. In this example, the ad 360 is presented in the video display region 110, while the ad 120C is presented in the advertising content region 120. The overlaid ad may be presented, for example, if the server or broadcaster is capable of overlaying an image on the broadcasting video. In this example, the overlaid ad 160 is advertising that the following show that is programmed to play next in the programming lineup. The overlaid ad 160 may be triggered at a particular time mark (not shown in the index). For example, the next-video-to-air ad 160 may be triggered to display at a time, such as 5 minutes before the end of the current playing video.

Figure 1D:
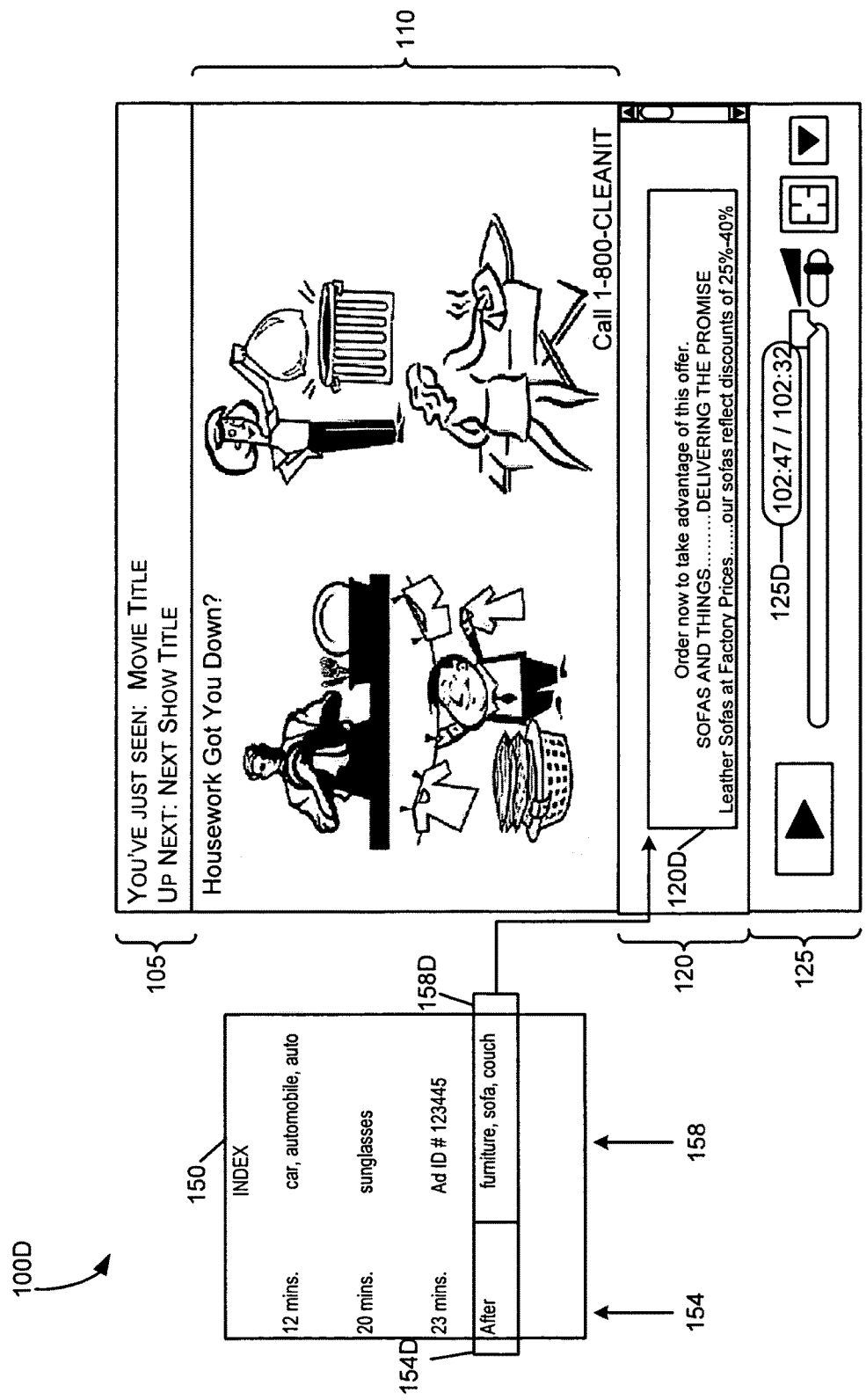

Continuing the example, FIG. 1D is another example user interface 100D illustrating advertising content displayed on a screen with video content. In this example, movie from FIGS. 1A-1C has completed. As such, the playback information region 105 includes text indicating previous programming and next programming. For example, the playback information region 105 shows "You've Just Seen: Movie Title" and "Up Next: Next Show Title."

The elapsed time display 125D shows a running time of 102:47/102:32 indicating the video is ended. In some implementations, a post-roll advertisement may be presented. As shown, the video playback region 110 shows an ad about housework and a cleaning service. While the ad is presented, the region 120 presents a different advertisement 120D for purchasing furniture. As shown, the ad 120D correlates to the selected time mark 154D (e.g., after) and the corresponding keywords 158D (e.g., furniture, sofa, couch).

For example, once the video content completes, the server hosting the video content triggers presentation of post-roll ad 120D. For example, the server may access index 150, retrieve the ad trigger 158D for time mark 154D, and present the example advertisement 120D to the viewer. After completion of the movie, the preloaded post-roll ad is triggered and presented to the viewer. In some implementations, the ad may not be preloaded, but instead may be determined using various matching techniques and keywords 158D. At some point, the viewer may view the furniture advertisement 120D and may choose to select the ad or ignore the ad, for example.

In some implementations, temporally targeted content may be triggered based on a bidding process. As an example, a regularly scheduled prime-time program (e.g., a program played between 7 PM-9 PM) may include advertising time slots. The advertising time slots may be associated with a number of time marks. One or more advertisers may view the time marks, the content associated with the time marks and place a bid on a particular time slot. The advertising time slots may be auctioned to the highest bidders. As such, upon reaching the time mark, the ad associated with the highest bid may be presented.

In some implementations, advertisements presented within or proximate to video content may be interactive through a service provider. For example, voting information for a television program may be overlaid as an advertisement to solicit votes.

In some implementations, temporally based ad targeting may be used by online television service providers, online video streaming service providers, traditional media content publishers and other content providers.

Figure 2:
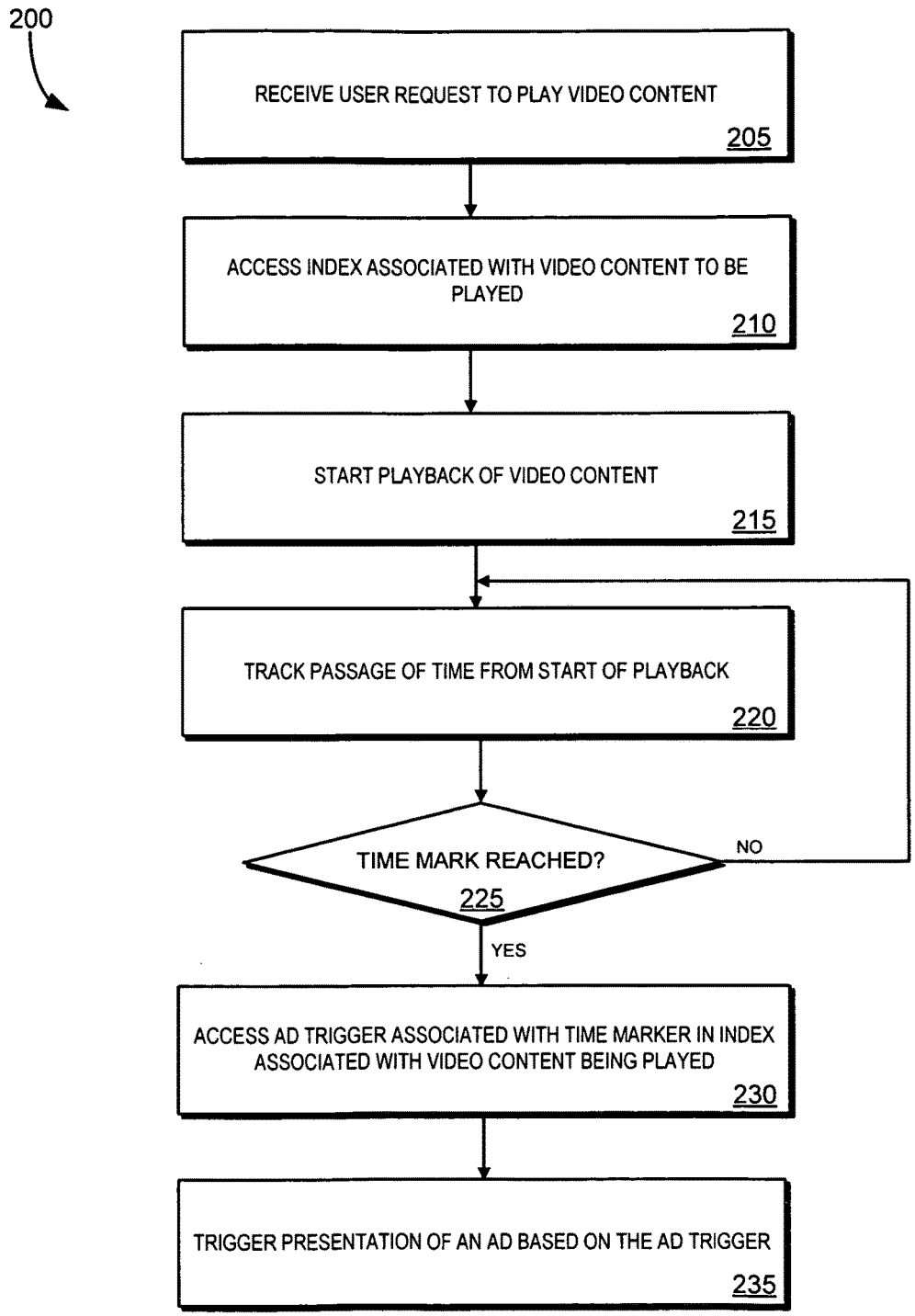
FIG. 2 is an example flow diagram of a process for providing temporal targeted content.

FIG. 2 is an example flow diagram of a process 200 for providing temporal targeted content. In general, the process 200 includes accessing a video content index, querying a time mark status, accessing a relevant advertisement, and triggering the advertisement for presentation.

The process 200 may be performed, for example, by an advertisement provider system which obtains video content from a video content provider and provides video content and advertisements to a user playback device. In another example, a media player operating on a user playback device may access time marks associated with keywords and playback preloaded ads or request, from an advertisement provider system, appropriate advertisements for playback. In yet another example, a content provider system may process time marks associated with keywords and request from an advertisement provider system appropriate advertisements to provide to a media player operating on a user playback device.

More particularly, a user request to play video content is received (205) and an index associated with the video content to be played is accessed (210). For example, the processor may read index 150, which includes preconfigured time marks 154 and the associated keywords or specific advertisement identifiers (e.g., Ad ID#123445) 158, as described previously with respect to FIGS. 1A-1D. For example, the time marks may be established from the start of a specific show or from when the program began playing on a particular channel. Content categories or keywords may be associated with the time marks thereby creating annotated video content. To facilitate annotation, program guide information may be imported from an existing source, such as TV Guide, for example. By importing program data from an existing source, a portion of the time marks and content categories may be automatically assigned. Additional time marks may be set up within each show or relative to the start of the first program played on a particular channel.

The video content playback is started (215). The video may be played in a standalone video player module or in an embedded player module/plug-in. In an example implementation, the video is played in a video player user interface in a web page, such as that described above with relation to FIGS. 1A-D, displayed on a video playback device. In some implementations, the video begins playing after the entire video is downloaded into memory (volatile and/or nonvolatile) at the video playback device. In some other implementations, the video is streamed to the video playback device.

During the playback of the video, the processor tracks passage of the time elapsed from the start of playback (220). The playback start time may represent an absolute time or a relative time indicating when playback of the video content is commenced. For example, the playback start time may be absolute, such as 1:12 a.m. In another example, the playback start time may be relative, such as 00:00 minutes. For example, the processor may detect when a video stream begins and track time relative to the video playback start time. In some implementations, a television cable box or television may track passage of the time elapsed from the start of playback.

The processor continues to track the passage of time until the time mark is reached (or the video ends) (225). In some implementations, a time mark may not be reached. As such, the processor continues playing video and tracking the passage of time.

Upon reaching a preconfigured time mark, the processor accesses an ad trigger associated with the time mark within the index associated with the playing video content (230). The ad trigger may, for example, by keywords associated with the time mark, an identifier of a particular ad or another type of information by which an ad may be selected for presentation.

The processor triggers presentation of an ad based on the ad trigger (235). To do so, for example, the processor may request an ad from an advertisement system, such as by sending keywords, programming guide data, video content data, index content, and other metadata extracted from the video content to be used in an ad matching process to obtain an appropriate advertisement. In some implementations, the processor may access an enumerated ad identified by the ad trigger.

Once an advertisement is determined for presentation, the processor invokes presentation of the matched advertisement. For example, the advertisement may be presented in the same frame, in a different frame, or any other surrounding viewing area. As an example, while watching a video, a time mark may be configured in a scene where a particular make and model of a car is being driven. Upon reaching the time mark, a car purchasing application may be loaded in a frame outside of the main video frame. The car purchasing application may enable a user to purchase a car, or get information about the car.

The processor continues to track the passage of time until another time mark is reached (225), at which point, the processor accesses the associated ad trigger (230) and triggers presenting of the ad (235) until the video ends or is otherwise stopped.

It should be appreciated that it may be possible that no advertisement is transmitted for a particular time mark. For example, the ad server may determine that no advertiser provided an advertisement for placement with the video. In another example, the ad server may determine that the ad request does not satisfy any placement preferences of advertisements. When playback of the video reaches the time mark, the advertisement slot may be bypassed, and playback continues from the next portion of the video.

Figure 3:
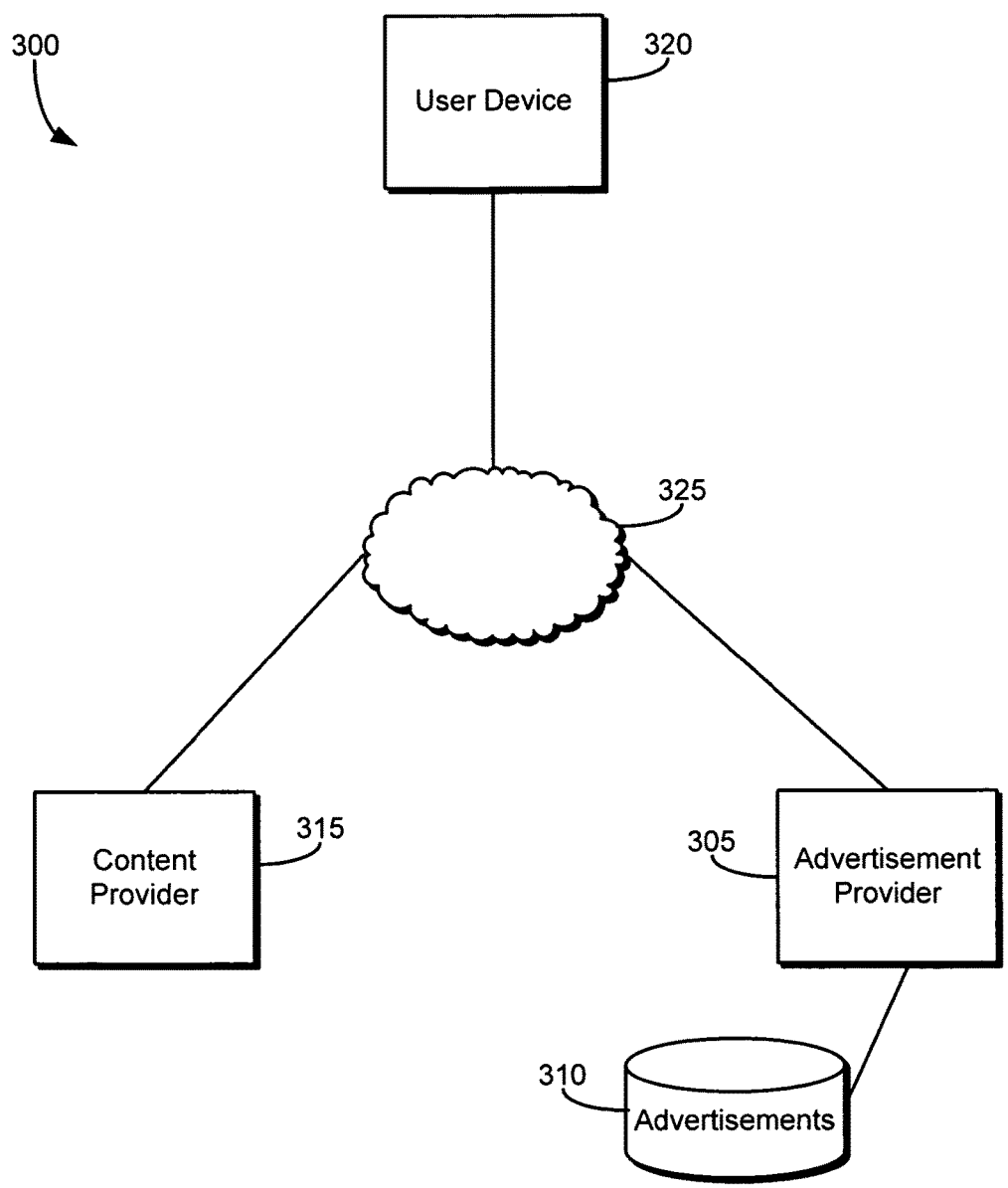
FIG. 3 illustrates an example of an environment for providing advertisements for video content items.

FIG. 3 shows an example of an environment 300 for providing advertisements for video content items. A "video content item" is an item of content that includes content that may be perceived visually when played, rendered, or decoded. A video content item includes video data, and optionally audio data and metadata. Video data includes content in the video content item that may be perceived visually when the video content item is played, rendered, or decoded. Audio data includes content in the video content item that may be perceived aurally when the video content item is played, decoded, or rendered. A video content item may include video data and any accompanying audio data regardless of whether or not the video content item is ultimately stored on a tangible medium. A video content item may include, for example, a live or recorded television program, a live or recorded theatrical or dramatic work, a music video, a televised event (e.g., a sports event, a political event, a news event, etc.), video voicemail, etc. Each of different forms or formats of the same video data and accompanying audio data (e.g., original, compressed, packetized, streamed, etc.) may be considered to be a video content item (e.g., the same video content item, or different video content items).

A video content item may also include many types of associated data. Examples of types of associated data include video data, audio data, closed-caption or subtitle data, a transcript, content descriptions (e.g., title, actor list, genre information, first performance or release date, etc.), related still images, user-supplied tags and ratings, etc. Some of this data, such as the description, may refer to the entire video content item, while other data (e.g., the closed-caption data) may be temporally-based or time-coded. In some implementations, the temporally-based data may be used for targeting ad content to users. For example, "chapter/title" information encoded on a DVD for a movie, television program or another type of video presentation may be used as an annotation to trigger presentation of an ad or ads. An index may be created based on the time and text from chapter/title information.

The environment 300 includes, or is communicably coupled with, an advertisement provider system 305 (having access to advertisement repository 310), a content provider system 315, and one or more user devices 320, at least some of which communicate across network 325. In general, the advertisement provider system 305 may provide relevant advertising content ("ad content") or other relevant content to a video content item. By way of example, reference is made to delivering ad content, though other forms of content (e.g., other content item types) may be delivered. The presented content may be provided by the content provider system 315 through the network 325. The ad content may be distributed, through network 325, to one or more user devices 320 before, during, or after presentation of the material. In some implementations, advertisement provider system 305 may be coupled with an advertising repository 310. The ad repository stores advertisements that may be presented with various types of content, including audio and/or video content. The selection of advertisements for presentment with the video content item is determined based on temporal targeting, such as described previously. For example, an ad may be targeted for presentation in a video content item at a particular point in time of the video content item.

Video content may be consumed at various client locations, using various devices. Examples of the various devices include customer premises equipment which is used at a residence or place of business (e.g., computers, video players, video-capable game consoles, televisions or television set-top boxes, etc.), a mobile telephone with video functionality, a video player, a laptop computer, a set top box, a game console, a car video player, etc. Video content may be transmitted from various sources including, for example, terrestrial television (or data) transmission stations, cable television (or data) transmission stations, satellite television (or data) transmission stations, via satellites, and video content servers (e.g., Webcasting servers, podcasting servers, video streaming servers, video download Websites, etc.), via a network such as the Internet for example, and a video phone service provider network such as the Public Switched Telephone Network ("PSTN") and the Internet, for example.

Ad content may include text, graphics, still-images, video, audio, audio and video, banners, links (such as advertising providing a hyperlink to an advertiser's website), and other web or television programming related data. As such, ad content may be formatted differently, based on whether the ad content is primarily directed to websites, media players, email, television programs, closed captioning, etc. For example, ad content directed to a website may be formatted for display in a frame within a web browser. In other examples, ad content may be delivered in an RSS (Real Simple Syndication) feed, or ad content may be delivered relative to a radio item (such as before, during or after a radio item). As yet another example, ad content directed to a video player may be presented "in-stream" as video content is played in the video player. In some implementations, in-stream ad content may replace the video or audio content in a video or audio player for some period of time or may be inserted between portions of the video or audio content. An in-stream advertisement may be placed pre-roll, post-roll, or mid-roll relative to video feature content. An in-stream advertisement may include video, audio, text, animated images, still images, or some combination thereof.

The content provider system 315 may present video content to users (e.g., user device 320) through the network 325. In some implementations, the content provider system 315 may include web servers where the content includes webpages or other content written in the Hypertext Markup Language (HTML), or any language suitable for authoring webpages. In general, content provider system 315 may include users, web publishers, and other entities capable of distributing video content over a network. For example, a web publisher may post a video file on a publicly available web server for download and playing by other users. In some implementations, the content provider system 315 may make the content accessible through a known Uniform Resource Locator (URL).

The content provider system 315 may receive requests for video content. The content provider system 315 may retrieve the requested video content in response to, or otherwise service, the request. The content provider system 315 may broadcast video content as well (e.g., providing content though not necessarily responsive to a request).

Content provided by content provider system 315 may include news, weather, entertainment, or other consumable textual, audio, or video media. More particularly, the content may include various resources, such as documents (e.g., webpages, plain text documents, Portable Document Format (PDF) documents, and images), video or audio clips, etc. In some implementations, the content may be graphic-intensive, media-rich data, such as, for example, Flash-based content that presents video and sound media.

The environment 300 includes one or more user devices 320. The user device 320 may include a desktop computer, laptop computer, a media player (e.g., an MP3 player, a streaming audio player, a streaming video player, a television, a computer, a mobile device, a DVD player, etc.), a mobile phone, a browser facility (e.g., a web browser application), an e-mail facility, telephony means, a set top box, a television device, a radio device or other device that may access advertisements and other content via network 325. The content provider system 315 may permit user device 320 to access content (e.g., video files for downloading or streaming).

The network 325 facilitates wireless or wireline communication between the advertisement provider system 305, the content provider system 315, and any other local or remote computers (e.g., user device 320). The network 325 may be all or a portion of an enterprise or secured network. In another example, the network 325 may be a virtual private network (VPN) between the content provider system 315 and the user device 320 across a wireline or a wireless link. While illustrated as a single or continuous network, the network 325 may be logically divided into various sub-nets or virtual networks without departing from the scope of this disclosure, so long as at least a portion of the network 325 may facilitate communications between the advertisement provider system 305, content provider system 315, and at least one client (e.g., user device 320). In certain implementations, the network 325 may be a secure network associated with the enterprise and certain local or remote clients 320.

Examples of network 325 include a local area network (LAN), a wide area network (WAN), a wireless phone network, a Wi-Fi network, a WiMax network, a broadband network, and the Internet.

In some implementations, a video content item is combined with one or more of the ads provided by the advertisement provider system 305, for example, based on content played at a particular time (e.g., when a particular amount of time has passed from the start of the playing of the video content item). This combined information including the content of the content item and ad(s) is then forwarded toward a user device 320 that requested the content item or that configured itself to receive the content item, for presentation to a user.

The content provider system 315 may transmit information about the ads and how, where or when the ads are to be rendered relative to the start of the video content playing, and/or information about the results of that rendering (e.g., ad spot, specified segment, position, selection or not, impression time, impression date, size, temporal length, volume, conversion or not, etc.) back to the advertisement provider system 305 through the network 325. Alternatively, or in addition, such information may be provided back to the advertisement provider system 305 by some other means.

In some implementations, the content provider system 315 includes advertisement media as well as other content. In such a case, the advertisement provider system 305 may determine and inform the content provider system 315 which advertisements to send to the user device 320, for example.

Figure 4:
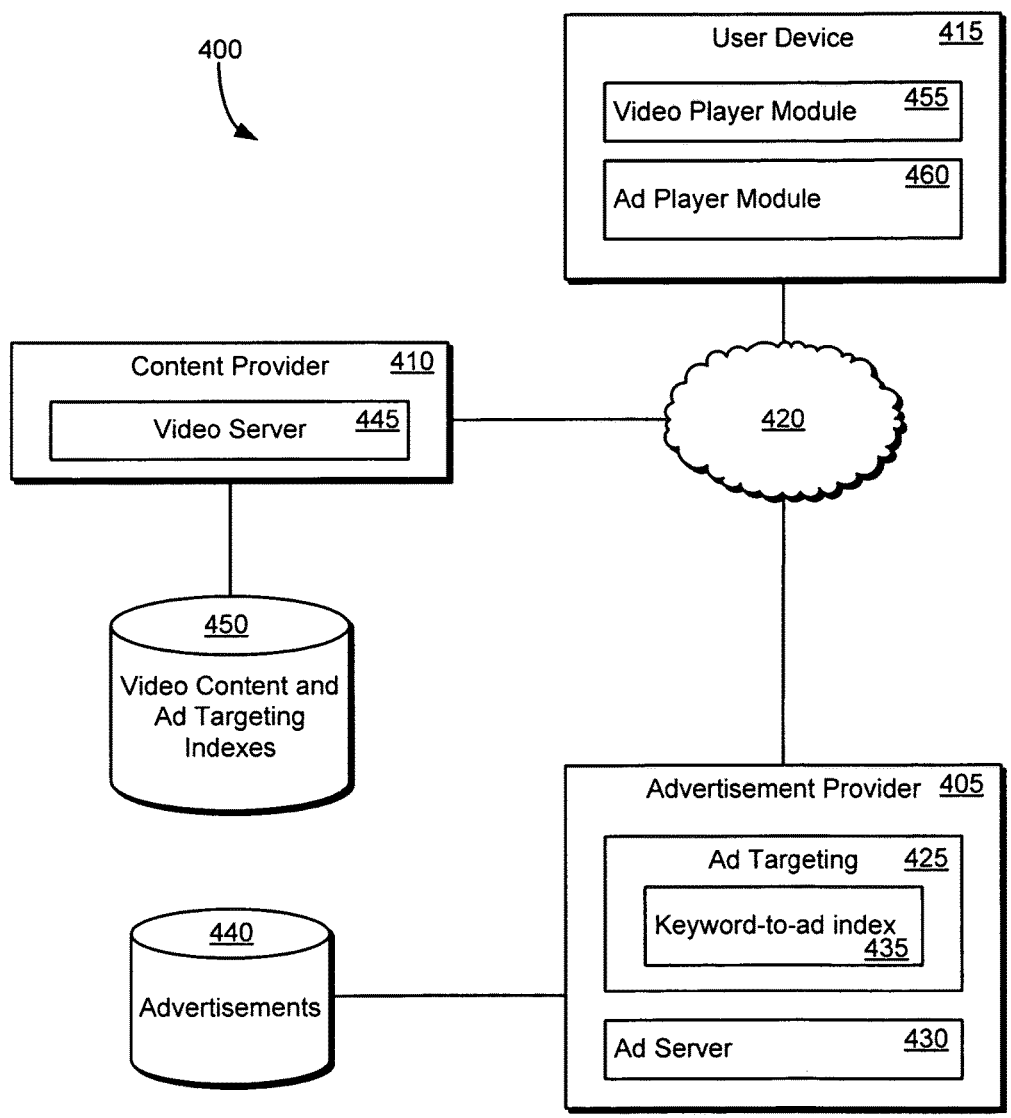
FIG. 4 is a block diagram illustrating an example environment in which electronic promotional material may be identified according to targeting criteria.

FIG. 4 is a block diagram illustrating an example environment 400 in which electronic promotional material (e.g., advertising content or advertisements) may be identified according to targeting criteria. Environment 400 includes, or is communicatively coupled with advertisement provider system 405, content provider system 410, and user device 415, at least some of which communicate across network 420.

The advertisement provider system 405 includes an ad targeting module 425 and an ad server 430. The ad targeting module 425 is used to target ads that provide relevant ad content for video content. More particularly, the ad targeting module 425 includes a keyword-to-ad index 435 for video content items where the keyword-to-ad index 435 for a particularly video content item includes time marks and corresponding content identification (such as keywords, topics, concepts, categories, and the like).

Advertisement provider system 405 also includes an ad server 430. Ad server 430 may directly, or indirectly, enter, maintain, and track advertisement information. The ads may be in the form of graphical ads such as so-called banner ads, text only ads, image ads, audio ads, video ads, ads combining one of more of any of such components, etc. The ads may also include embedded information, such as a link, and/or machine executable instructions. User devices 415 may submit requests for ads to, accept ads responsive to their request from, and provide usage information to, the ad server 430. An entity other than a user device 415 may initiate a request for ads. Although not shown, other entities may provide usage information (e.g., whether or not a conversion or selection related to the advertisement occurred) to the ad server 430. For example, this usage information may include measured or observed user behavior related to ads that have been served.

The ad server 430 may include information concerning accounts, campaigns, creatives, targeting, etc. The term "account" relates to information for a given advertiser (e.g., a unique email address, a password, billing information, etc.). A "campaign," "advertising campaign," or "ad campaign" refers to one or more groups of one or more advertisements, and may include a start date, an end date, budget information, targeting information, syndication information, etc.

The advertisement provider system 405 may use one or more advertisement repositories 440 for selecting ads for presentation to a user or other advertisement providers. The repositories 440 may include any memory or database module and may take the form of volatile or non-volatile memory including, without limitation, magnetic media, optical media, random access memory (RAM), read-only memory (ROM), removable media, or any other suitable local or remote memory component.

As an example, an ad request that identifies a time mark within a particular video content item may be received from a user device 415 by the advertisement provider system 405. The ad targeting module 425 processes the request using the keyword-to-ad index 435 that corresponds to the video content item to analyze the keywords that match the received time mark to identify relevant advertisements. Upon finding a match, the ad targeting module 425 retrieves the matched advertisements from the advertisement repository 440 and sends the matched advertisements to the network 420 for consumption by the user device 415, for example. The matching ads may be preloaded into ad slots corresponding to time marks, or delivered to the user device 415 upon availability. Additionally or alternatively, the user device 415 may pre-fetch, from the advertisement provider system 405, ads to be loaded into ad slots corresponding to time marks or may pre-fetch a video content item with preloaded ads. In one example, a mobile device configured to play video content may be preloaded with a video content item and ads corresponding to time marks to be displayed in conjunction with playing the video content item.

In some implementations, the advertisement provider system 405 may receive content from the content provider system 410. The techniques and methods discussed in the above description may be applied to the received content. The advertisement provider system 405 may then provide advertising content to the content provider system 410 that corresponds to the received/analyzed content.

The content provider system 410 includes a video server 445. The video server 445 may be a content server in which the content served is a video content item, such as a video stream or a video file for example. Further, video player applications may be used to render video files. As described previously, ads may be served in association with video content items. For example, one or more ads may be served before, during, or after a video content item based on temporal characteristics, such as the passage of time from the start of the video content item or the programmed start time of a video content item.

The content provider system 410 may have access to various content repositories. For example, a video content and ad targeting index repository 450 may include index items and corresponding targeting criteria (e.g., time marks and associated keywords or categories for a particular video or website). In some implementations, the advertisement provider system 405 analyzes the material from the repository 450 and determines the targeting criteria for the received material. This targeting criteria may be correlated with the material in the video server 445 for future use, for example. In some implementations, the targeting criteria for a content item in the repository is associated with a unique index of the content item.

In operation, the advertisement provider system 405 and the content provider system 410 may both provide content to the user device 415. The user device 415 is one example of an advertisement consumer. The user device 415 may include a user device such as a media player (e.g., an MP3 player, a streaming audio player, a streaming video player, a television, a computer, a mobile device, etc.), a browser facility, an e-mail facility, telephony means, etc.

As shown in FIG. 4, the user device 415 includes a video player module 455 and an ad player module 460. The video player module 455 may execute video content items received in the system 415. For example, the video player module 455 may play back video files or streams, advertisements, overlays, and the like.

The ad player module 460 may execute or play advertisements before, during, or after content plays on ad player module 460. In general, the ad player module 460 may present advertisements received from advertisements providers 405. In some implementations, the ad player module 460 interactively functions with the video player module 455. For example, the ad player module 460 may present advertisements within video player module 455, such as described previously with respect to FIGS. 1A-1D.

Although the foregoing examples described servers as (i) requesting ads, and (ii) combining them with content, one or both of these operations may be performed by a user device (e.g., an end user computer, for example). Moreover, a single entity can provide both content and ads in some implementations.

Figure 5:
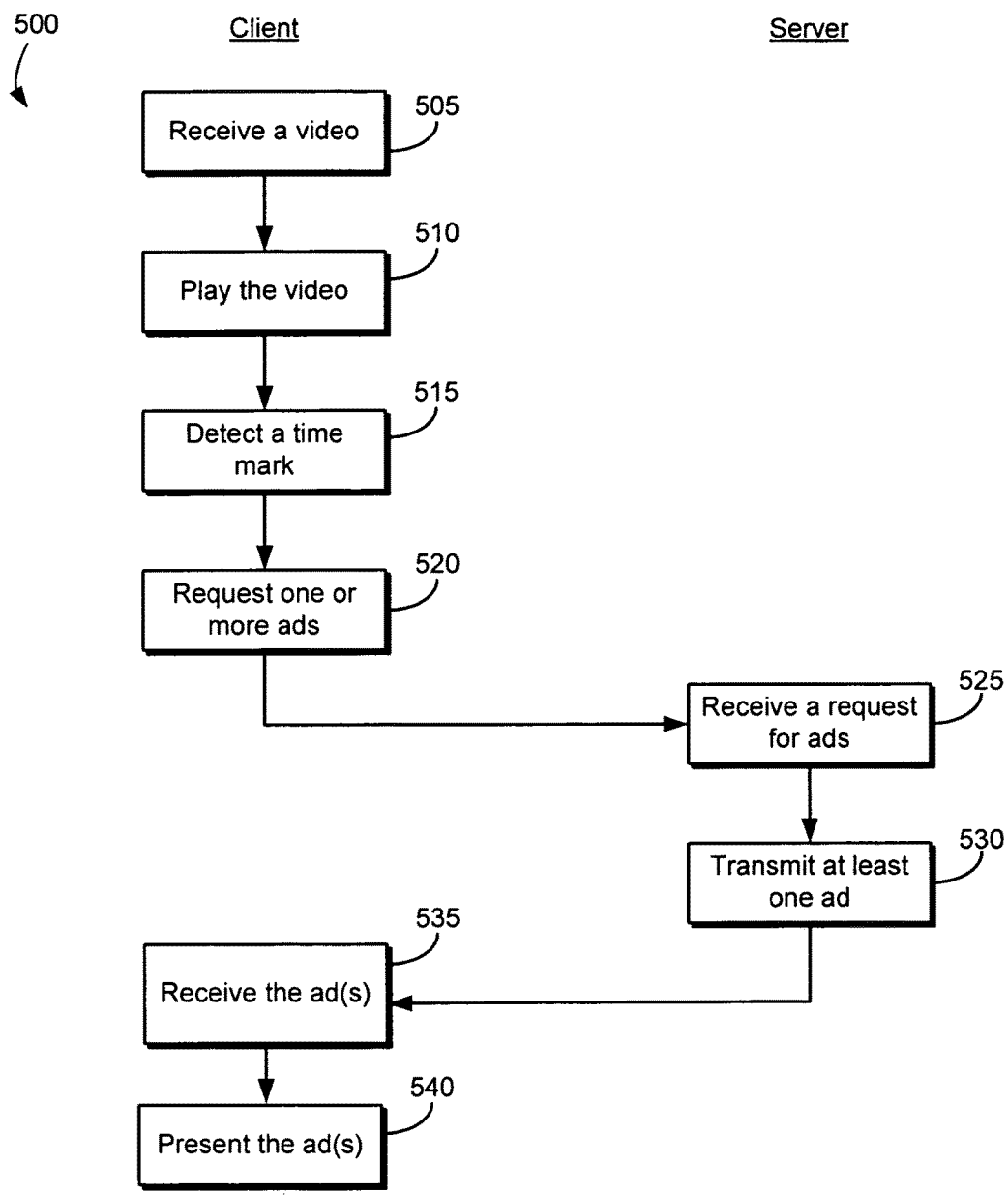
FIG. 5 is an example flow diagram of a process for providing an advertisement for a video.

FIG. 5 is an example flow diagram of a process 500 for providing an advertisement for a video. A video is received by a client (505), which, for example, may be an implementation of a user device 320 of FIG. 3. In some implementations, after the client sends a request for the video to the publisher, a video is received by a client from the publisher, which, for example, may be an implementation of the content provider system 315 of FIG. 3. The request may be sent by the client, in response to the client attempting to access the video. For example, the client may have loaded, at a user's command, a web page within a web browser application, where the web page has an embedded video, referred by its URL.

The video is played (510). The video may be played, for example, in a standalone video player module or in an embedded player module/plug-in. In an example implementation, the video is played in a video player user interface in a web page, such as that described above with relation to FIGS. 1A-D. In some implementations, the video begins playing after the entire video is downloaded into memory (volatile and/or non-volatile) at the client. In some other implementations, the video is streamed to the client. The video may be played in contexts other than streaming, such as a video being played on a DVD player or a digital video recorder (DVR).

During the playback of the video, an impending time mark in the video is detected (515), and one or more video advertisements are requested (520). The video advertisements are requested for placement in the detected time mark and for display to the user when playback of the video reaches the time mark. In one example, the request asks for one or more advertisements corresponding to an ad trigger associated with the time mark (such as one or more keywords associated with a time mark), without requesting for any specific advertisement. The request may include an identifier of the video (e.g., a video ID) and a time mark for which an advertisement is to be selected. Alternatively, the request may include an identifier of the video and the ad trigger for the time mark (such as the keyword or keywords corresponding to the time mark). In another example, the request may ask for a specific advertisement that is associated with a time mark. The request may include an identifier of the advertisement.

The request is received by, for example, an ad server (525). In some implementations, the ad server may be a video provider, such as a content provider system 315 of FIG. 3, or an advertisement provider, such as advertisement provider system 305 of FIG. 3. In some implementations, the server may identify the video for which the video advertisement is placed by a video identifier included in the request. The identity of the video for the video advertisement may be used to track advertisement placements. The server may determine one or more video advertisements for placement based on any number of factors, including, but not limited to, the ad trigger (such as keyword or keywords) corresponding to the time mark relative to video feature content.

One or more advertisements are transmitted (530). In some implementations, the advertisement(s) are transmitted from the content publisher at the request of the ad server. In some other implementations, the advertisement(s) are transmitted by the ad server. In yet other implementations, advertisements may be pre-loaded at the video player by a video content provider or advertiser. For example, one or more advertisements may be preloaded with the video content. Preloaded ads are ads that are preconfigured into the video content before users download the content. As such, a user client device may receive an advertisement in the video device, for example, without accessing an external source.

The advertisement(s) is received by the client (535). The received advertisement(s) is played when playback of the video reaches the time mark (540). In one example, the advertisements may be presented in advertisement content region 120 of FIGS. 1A-1D.

The implementations above were described in reference to a client-server system architecture. It should be appreciated, however, that system architectures other than a client-server architecture may be used. In one example, the system architecture may be a peer-to-peer architecture. In another example, the system architecture may be a client-side only architecture, such as a portable player that includes a pre-loaded video and ads.

Figure 6:
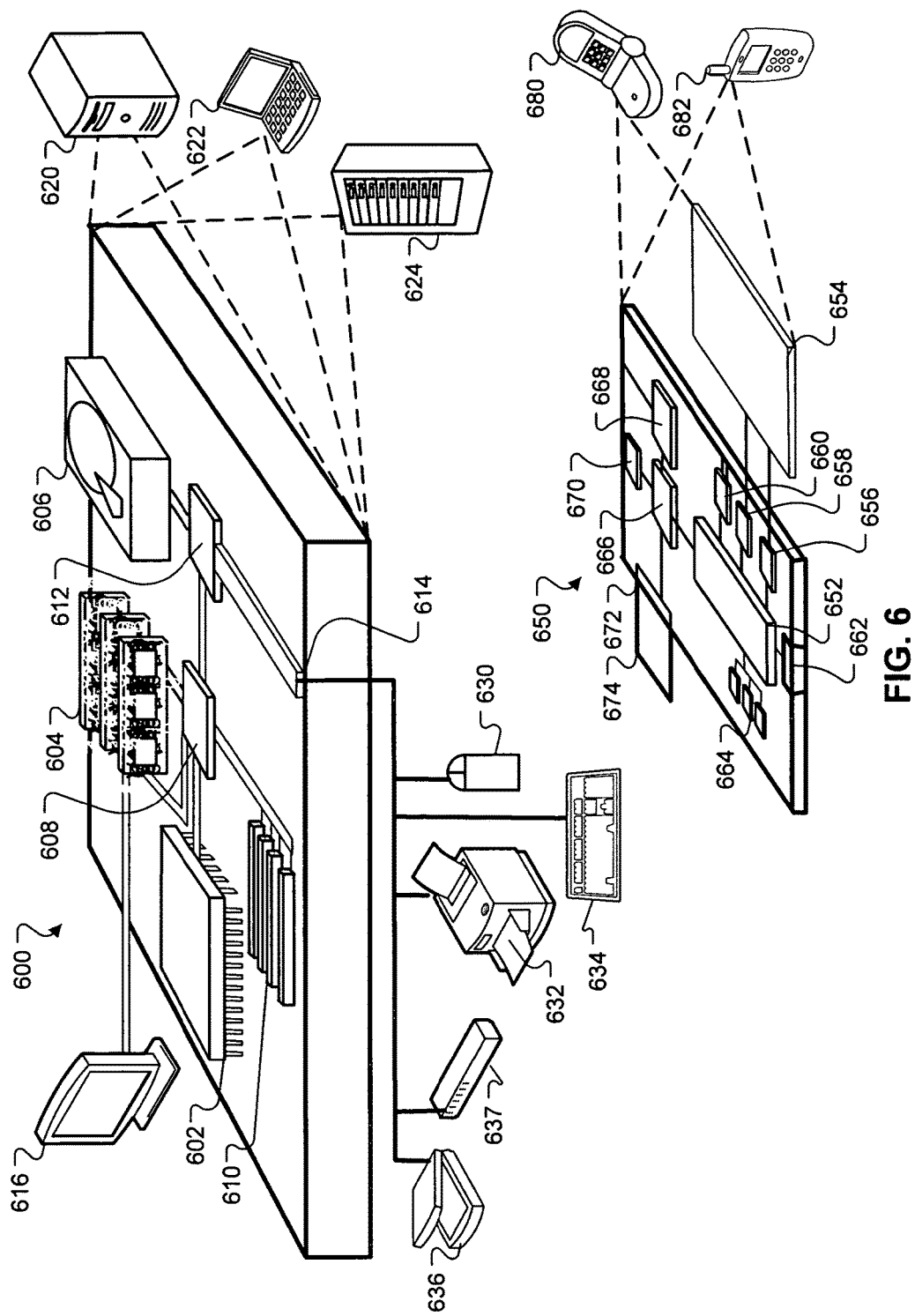
FIG. 6 is a block diagram illustrating an example generic computer and an example generic mobile computer device.

FIG. 6 shows an example of a generic computer device 600 and a generic mobile computer device 650, which may be used with the techniques described above. Computing device 600 is intended to represent various forms of digital computers, such as laptops, desktops, workstations, personal digital assistants, television set-top boxes, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described and/or the claims.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a pointing device 630, a printer 632, a keyboard 634, a scanner 636, or a networking device 637 such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The techniques and concepts have been described generally using a time mark relative to presentation of video content or audio content to trigger presentation of an ad. The techniques and concepts also may be applied to other types of content, such electronic books, blogs, other types of streamed content, etc. In one example, an ad may be triggered based on a time mark associated with content of an electronic book.

The techniques and concepts generally have been described using a time mark to trigger presentation of an ad. The techniques and concepts also may be used to trigger other actions, such as presenting content other than an ad (such as initiating an application), initiating a telephone call to someone, and pausing the video. In one example, a pop-up window or another type of data input user interface element may be triggers that enables a user who is viewing the video to complete a form or other type of information gathering user interface.

A number of implementations have been described. Nevertheless, it will be understood that various modifications may be made. For example, various forms of the flows shown above may be used, with steps re-ordered, added, or removed. Other implementations are within the scope of the following claims.

What is claimed is:

1. A computer-implemented method, comprising:
   identifying a time mark that represents a point of time relative to a playback start time of a video wherein the time mark represents an opportunity to display an advertisement when the video is displayed at a future time to a given user;
   determining one or more keywords to associate with the time mark, including extracting one or more keywords based on information from a program guide or content included in the video that generally describes the video or a specific portion of the video, annotating the video based on the extracted keywords, and creating an index that links a time mark and the extracted keywords;
   storing the index;
   determining that the video has been selected for playback;
   starting playback of the video;
   monitoring an elapsed time of playback of the video;
   determining that the elapsed time corresponds to a time of a first time mark included in the index; and
   triggering presentation of an advertisement to the viewer, responsive to the determination that the elapsed time corresponds to the time of the first time mark included in the index, the advertisement selected based on the corresponding keywords linked to the first time mark and stored in the index.

2. A computer-implemented method, comprising:
   identifying a time mark that represents a point of time relative to a playback start time of a video content item wherein the time mark represents an opportunity to display an advertisement when the video content item is displayed at a future time to a given user;
   creating a sponsored-content trigger including extracting one or more keywords from programming guide information associated with the video content item or content included in the video content item and creating an index that links the time mark with the extracted one or more keywords;
   storing the index;
   determining that the video content item has been selected for playback;
   starting playback of the video;
   monitoring an elapsed time of playback of the video;
   determining that the elapsed time corresponds to a time of a first time mark included in the index;
   conducting an auction including evaluating bids for sponsors that bid to present advertisements related to the keywords linked to the first time mark at the time of the first time mark; and
   triggering presentation of a winning sponsored-content item from the auction at the elapsed time corresponding to the time of the first time mark.

3. The method of claim 2, further comprising:
   identifying the sponsored-content item based on the index associated with the time mark.

4. The method of claim 3, wherein the bids each comprise one or more keywords describing video content; and further comprising:
identifying the sponsored-content item based on the one or more keywords that are associated both with the sponsored-content item and with the time mark.

5. The method of claim 4, wherein the one or more keywords comprise at least one keyword representing a category of keywords.

6. The method of claim 2, wherein:
the bids each specify an advertisement to be presented.

7. The method of claim 2, wherein triggering presentation of the sponsored-content item further comprises triggering presentation of the sponsored-content item that is included with the video content item.

8. The method of claim 2, wherein triggering presentation of the sponsored-content item further comprises triggering presentation of the sponsored-content item by accessing the sponsored-content item separately from accessing the video content item.

9. The method of claim 2, further comprising establishing the one or more keywords to be associated with the time mark by using programming guide information.

10. The method of claim 2, wherein the sponsored-content item comprises one or more of audio content, video content, an image or an application that enables a recipient to take action relative to the sponsored-content item.

11. The method of claim 2, wherein the elapsed time comprises an absolute time indicating when playback of video content started.

12. The method of claim 2, wherein the elapsed time comprises a relative time indicating when playback of video content started.

13. A computing device comprising:
a processor and
memory having the stored computer program including instructions, that when executed, cause the processor to:
identify a time mark that represents a point of time relative to a playback start time of a video wherein the time mark represents an opportunity to display an advertisement when the video content item is displayed at a future time to a given user;
create an index, the index including a linking from the time mark to one or more keywords, the keywords being extracted from program guide information associated with the video content item or from content included in the video content item;
store the index;
determine that the video content item has been selected for playback;
start playback of the video content items;
determine that an elapsed playback time corresponds to a time of a first time mark included in the index;
conduct an auction including evaluating bids for sponsors that bid to present advertisements related to the keywords linked to the first time mark at the first time mark; and
trigger presentation of a winning-sponsored-content item from the auction at the elapsed time corresponding to the time of the first time mark based on the index.

14. The computing device of claim 13, wherein the instruction cause the processor to track the elapsed playback time from starting playback of the video content.

15. The computing device of claim 13, wherein the first time mark represents a point of time that is independent of a playback start time of a video content item.

16. The computing device of claim 13, wherein the sponsored-content item represents one or more of an advertisement, an interactive form configured to receive user input, and an application capable of being executed by the computing device.

17. The computing device of claim 13, wherein the computing device comprises one or more of a user device capable of playing the video content item, a portable user device capable of tracking time and triggering the sponsored-content item based on time, a computer server capable of streaming the video content item to a viewer, a set-top box capable of tracking time and triggering the sponsored-content item based on time, a television capable of tracking time and triggering the sponsored-content item based on time, a music player capable of tracking time and triggering the sponsored-content item based on time, a mobile telephone capable of tracking time and triggering the sponsored-content item based on time, and a DVD player capable of tracking time and triggering the sponsored-content item based on time.

* * * * *